(12) United States Patent
Takaya et al.

(10) Patent No.: US 11,543,612 B2
(45) Date of Patent: Jan. 3, 2023

(54) CONNECTOR PLUG, CONNECTOR INSERTION METHOD, AND A CONNECTOR REMOVAL METHOD

(71) Applicant: NIPPON TELEGRAPH AND TELEPHONE CORPORATION, Tokyo (JP)

(72) Inventors: Masaaki Takaya, Musashino (JP); Yoshiteru Abe, Musashino (JP); Ryo Koyama, Musashino (JP); Chisato Fukai, Musashino (JP); Kazunori Katayama, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/287,308

(22) PCT Filed: Oct. 9, 2019

(86) PCT No.: PCT/JP2019/039859
§ 371 (c)(1),
(2) Date: Apr. 21, 2021

(87) PCT Pub. No.: WO2020/085096
PCT Pub. Date: Apr. 30, 2020

(65) Prior Publication Data
US 2022/0113484 A1 Apr. 14, 2022

(30) Foreign Application Priority Data
Oct. 24, 2018 (JP) .............................. JP2018-200364

(51) Int. Cl.
G02B 6/44 (2006.01)
(52) U.S. Cl.
CPC ........... *G02B 6/447* (2013.01); *G02B 6/4471* (2013.01)
(58) Field of Classification Search
CPC ..................................................... G02B 6/447
See application file for complete search history.

(56) References Cited

FOREIGN PATENT DOCUMENTS

| CN | 207303604 U | 1/2018 | |
|---|---|---|---|
| JP | H0479175 A | 3/1992 | |
| JP | H08263617 A | 10/1996 | |
| JP | H0951869 A | 2/1997 | |
| JP | 2005303809 A | 10/2005 | |
| JP | 201337173 A | 2/2013 | |
| JP | 201533816 A | 2/2015 | |
| JP | 201885176 A | 5/2018 | |
| WO | WO-2019080161 A1 * | 5/2019 | ............ C08L 27/06 |

* cited by examiner

Primary Examiner — Sung H Pak

(57) ABSTRACT

To provide a connector plug that makes it possible to facilitate a plurality of persons' confirmation of a connector plug before its removal or after its insertion and to prevent erroneous work. The connector plug according to the present invention has a discoloration member mounted on a gripping portion for pinching during work. The color of the discoloration member changes due to heat of a worker's fingertips when the worker pinches the connector plug or pressure when the worker pinches the connector plug. The discoloration member is discolored by one worker pinching the connector plug. Another worker looks at the discolored discoloration member, and then is able to confirm whether the connector plug is a work target.

7 Claims, 4 Drawing Sheets

CONNECTOR PLUG, CONNECTOR INSERTION METHOD, AND A CONNECTOR REMOVAL METHOD

CROSS-REFERENCE TO RELATED APPLICATIONS

This application is a 371 U.S. National Phase of International Application No. PCT/JP2019/039859 filed on Oct. 9, 2019, which claims priority to Japanese Application No. 2018-200364 filed on Oct. 24, 2018. The entire disclosures of the above applications are incorporated herein by reference.

TECHNICAL FIELD

The present disclosure relates to a connector plug for insertion into connector adapters which are aggregated in a high density as in a patch panel, a communication rack, or the like.

BACKGROUND ART

At present, optical wiring is introduced at various locations, and optical connectors are essential in the wiring. In a location where optical wiring is intensively switched, as shown in FIG. 1, a patch panel or a communication rack 1 is installed, and optical connector adapters 2 are arranged in a high density. A worker needs to select an objective location from the optical connector adapters 2 arranged in a high density, and insert an optical connector plug 3 thereinto. In addition, in a case where the connected optical connector plug 3 is removed, it is necessary to pick out an optical connector plug which is a target to be removed from among optical connector plugs which are inserted, and to accurately remove the optical connector plug which is a target.

An SC connector plug 3A is shown in FIG. 2 as a typical optical connector plug 3. The SC connector plug 3A is constituted by a ferrule 4 for fixing an optical fiber, a housing 5 for providing a detachable function, and an optical fiber cord 6 for protecting the optical fiber. In a case where the SC connector plug 3A is inserted into and removed from a patch panel, a worker pinches a gripping portion 7, and performs the task.

In recent years, optical wiring in buildings has increased with an increase in the amount of information, and amid this, there are a large number of optical connector connecting portions in an optical fiber cable core management wiring board, a patch panel, or the like. In such a location, various measures have been taken in order to eliminate erroneous removal of optical connector plugs. For example, in Patent Literature 1, by providing the optical connector plug with a bar code, a device reads information of an optical connector plug which is a target and compares the information with management data to prevent erroneous removal. In addition, according to the invention of Patent Literature 2, in an optical patch panel, a plate-like jig is installed below an optical connector adapter, and the jig is provided with information of an optical connector plug, to thereby visualize the identification of the optical connector plug. In this manner, how to facilitate the identification of the connector plug is shown through a variety of techniques.

CITATION LIST

Patent Literature

Patent Literature 1: JP 2005-303809 A
Patent Literature 2: JP 2013-037173 A

SUMMARY OF THE INVENTION

Technical Problem

In a case where work of inserting and removing a connector plug is performed in a panel in which a large number of such connector adapters are arranged, it is effective for a plurality of persons to perform the work in order to prevent erroneous work. In the case of Patent Literature 1 and 2, there is a problem in that it is difficult for a plurality of persons to confirm whether a desired connector plug is selected before its removal, and whether a connector plug is inserted into a desired connector adapter after its insertion. Consequently, in order to solve the above problem, an object of the present invention is to provide a connector plug that makes it possible to facilitate a plurality of persons' confirmation of a connector plug before its removal or after its insertion and to prevent erroneous work.

Means for Solving the Problem

In order to achieve the above object, a connector plug according to the present invention is configured such that a member which is discolored by application of pressure or heat is disposed on a portion (gripping portion) to be pinched during its insertion and removal.

Specifically, according to the present invention, there is a connector plug including a gripping portion that is formed at a housing, and a discoloration member that is disposed on the gripping portion and that changes color due to a change in pressure.

In addition, according to the present invention, there is provided a connector plug including a gripping portion that is formed at a housing, and a discoloration member that is disposed on the gripping portion and that changes color due to a change in temperature.

In the connector plug according to the present invention, it is preferable that the discoloration member returns, after a change of color, to color before the change over time.

When a connector plug is removed from a patch panel, one worker touches the gripping portion of the connector plug to change the color of the discoloration member, so that the other worker can confirm whether the connector plug that is about to be removed is correct. In addition, when one worker inserts a connector plug into a patch panel, the color of the discoloration member of the gripping portion of the connector plug changes, and thus the other worker can confirm whether the connector plug is inserted at a correct position of the patch panel.

Therefore, the present invention can provide a connector plug that makes it possible to facilitate a plurality of persons' confirmation of a connector plug before its removal or after its insertion and to prevent erroneous work.

Effects of the Invention

The present invention can provide a connector plug that makes it possible to facilitate a plurality of persons' confirmation of a connector plug before its removal or after its insertion and to prevent erroneous work.

DESCRIPTION OF EMBODIMENTS

Hereinafter, embodiments of the present invention will be described with reference to the accompanying drawings. The embodiments to be described below are examples of the present invention, and the present invention is not limited to the following embodiments. In this specification and the drawings, constituent elements having the identical reference signs are assumed to be the same.

Figure 1:
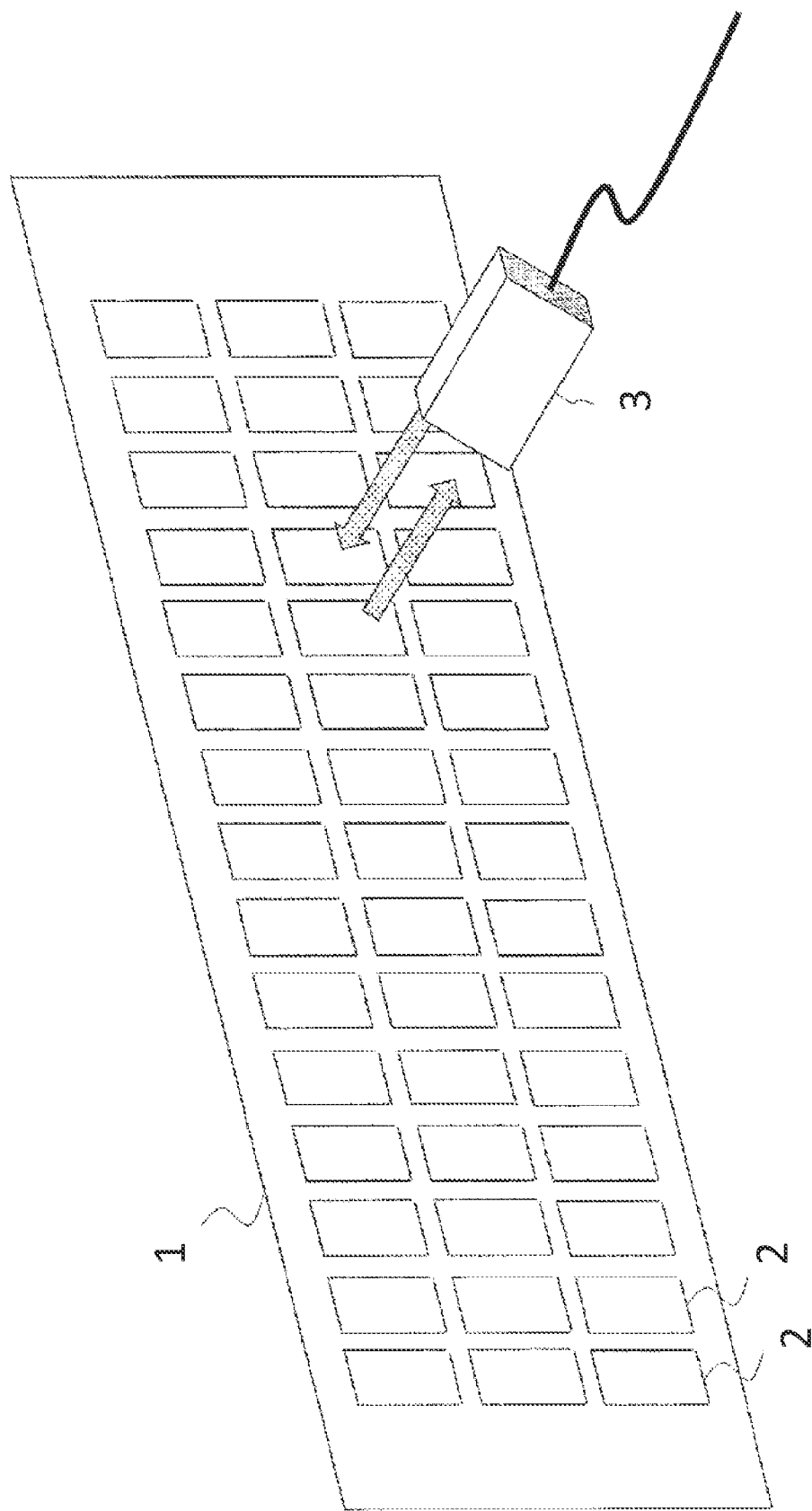
FIG. 1 is a diagram illustrating a patch panel/communication rack.
Figure 2:
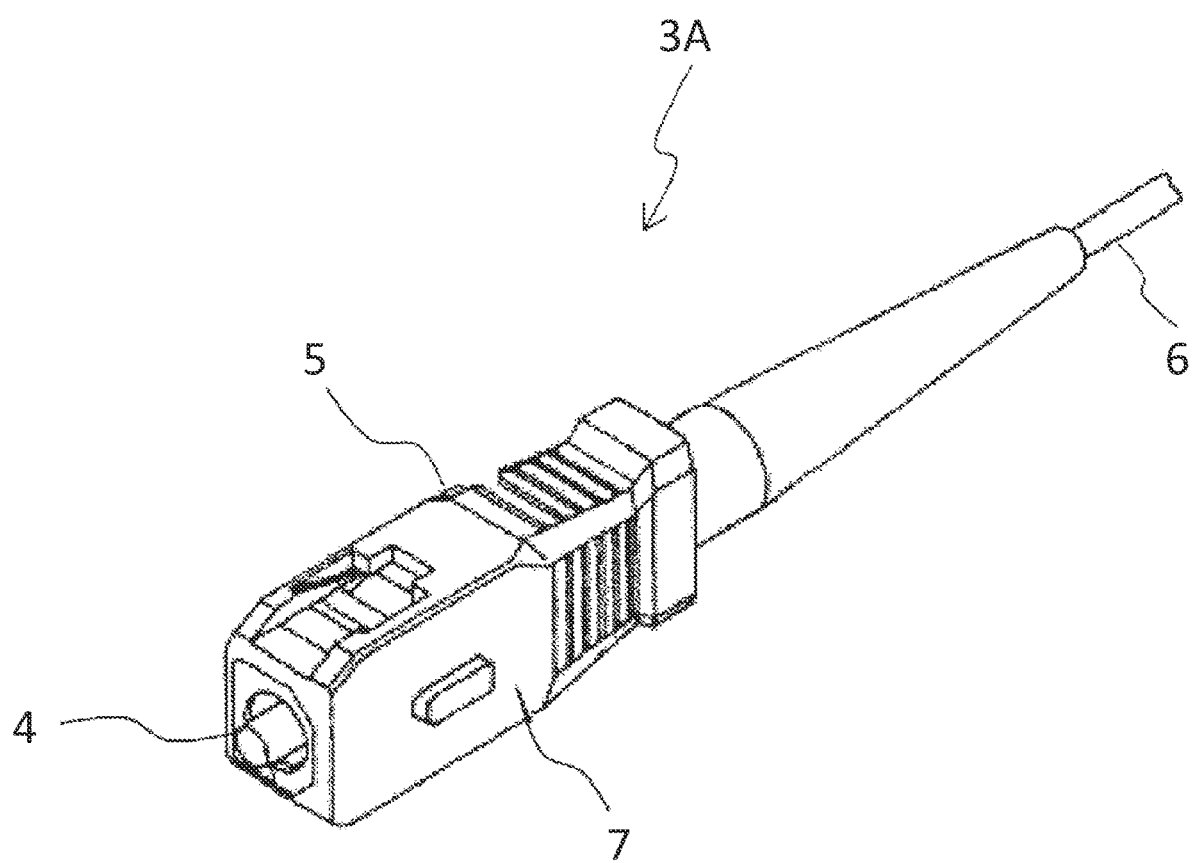
FIG. 2 is a diagram illustrating a related optical connector plug.
Figure 3:
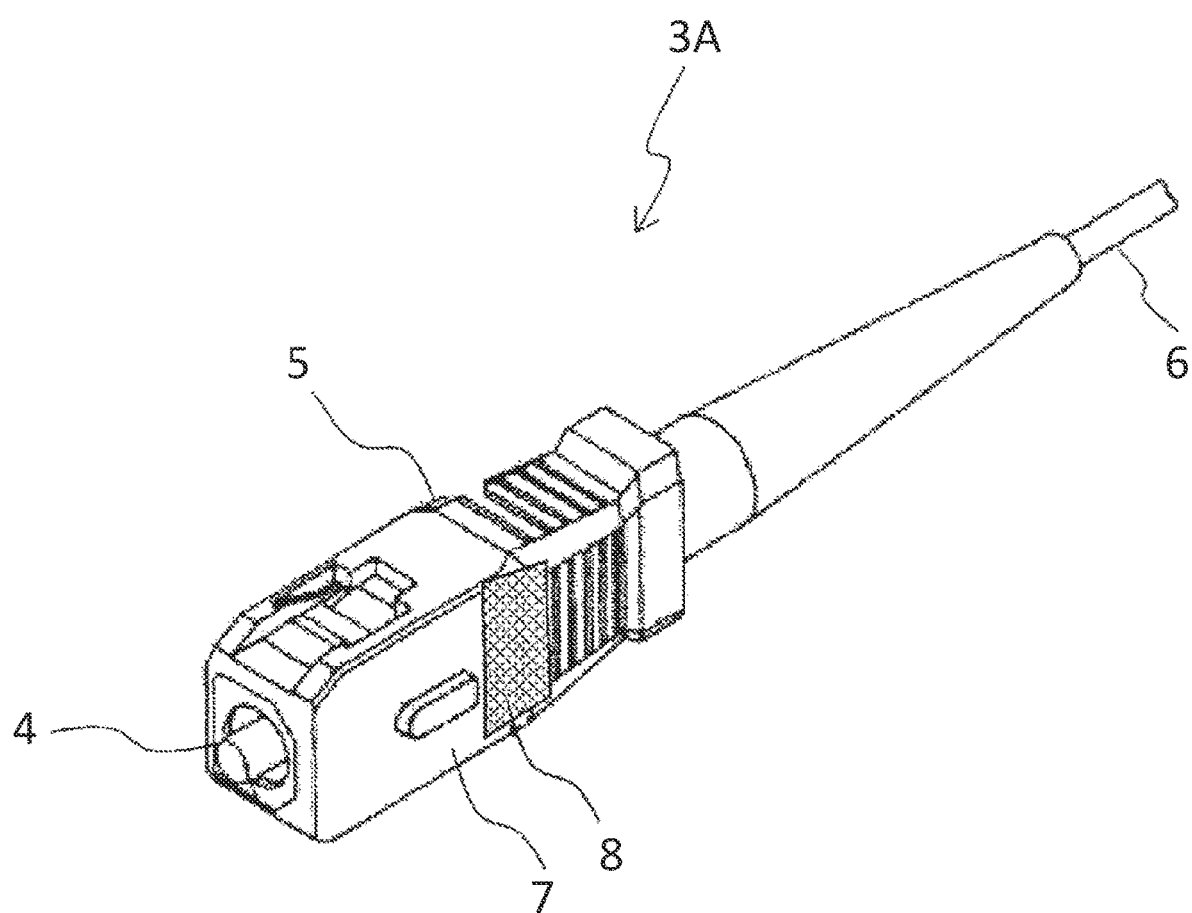
FIG. 3 is a diagram illustrating an optical connector plug according to the present invention.

FIG. 3 is a diagram illustrating a connector plug of the present embodiment. In the present embodiment, an SC connector plug 3A will be described as an example.

When the SC connector plug 3A is inserted and removed normally, the lateral side (a gripping portion 7) of a housing 5 is pinched, and the work is performed. As shown in FIG. 3, the SC connector plug 3A has a discoloration member 8 mounted on the gripping portion 7 for pinching during work. The size of the discoloration member 8 may be the entire lateral side of the housing 5, or may be a size large enough to be visually observed by a worker (for example, approximately 5 mm×5 mm).

Examples of the discoloration member 8 capable of being used include a material exhibiting a thermochromism phenomenon (a change in color with application of "heat"). Examples of such molecules include a copper-N,N-diethylethylenediamine complex $[Cu(dieten)_2](ClO_4)_2$ or the like. The molecule is reddish purple in color at room temperature, but is discolored to dark purple when heat of 43° C. or higher is applied. In this case, by warming a hand slightly before work, it is possible to provide a function such as a change in color when this portion is pinched. The discoloration member 8 exhibiting such a thermochromism phenomenon is defined as Example 1.

In addition, examples of the discoloration member 8 capable of being used include a material exhibiting a piezochromism phenomenon (a change in color with application of "pressure"). Examples of such molecules include molecules in which radical species are generated due to bond cleavage when pressure is applied, or the like. The radical species regenerate the bond when left alone, and return to their original colors. For this reason, it is possible to provide a function of changing the color only immediately after work is performed with this portion pinched. The discoloration member 8 exhibiting such a piezochromism phenomenon is defined as Example 2.

The discoloration material 8 as described above is mounted on a portion (the gripping portion 7) which is pinched by hand during work of inserting and removing the SC connector plug. In Example 1, it is possible to achieve a connector plug in which the color of the discoloration member 8 changes due to heat of a worker's fingertips when the worker pinches the SC connector plug. In addition, in Example 2, it is possible to achieve a connector plug in which the color of the discoloration member 8 changes due to pressure when the worker pinches the SC connector plug.

Figure 4:
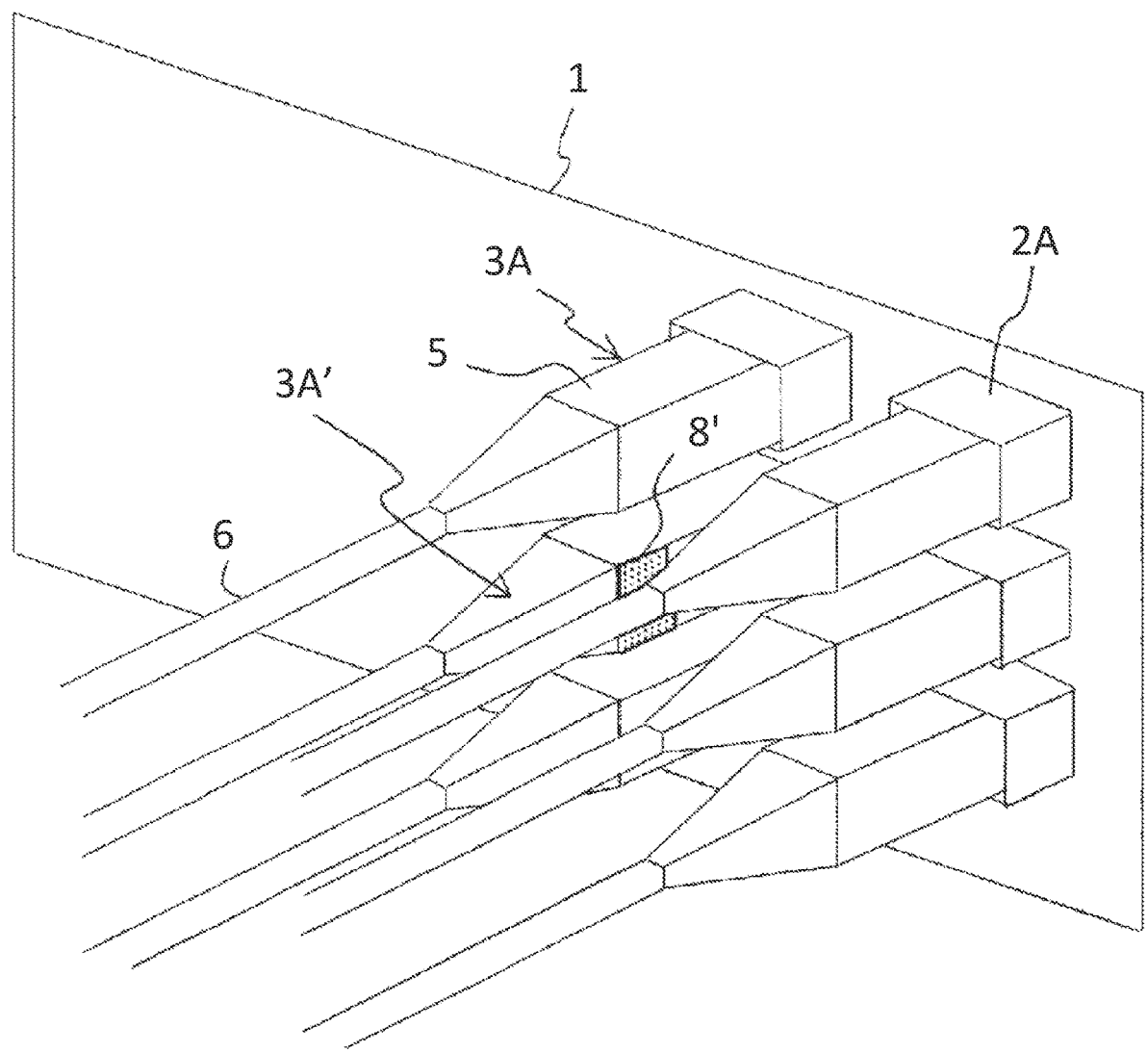
FIG. 4 is a diagram illustrating a work method with the optical connector plug according to the present invention.

FIG. 4 is a diagram illustrating work, performed in a patch panel 1, of inserting and removing the SC connector plug 3A. For example, a first worker compares a database, and inserts an SC connector plug 3A' into an SC connector adapter 2A located at a desired position of the patch panel 1. At this time, since a discoloration member 8' of the SC connector plug 3A' is discolored by being pinched, a second worker can confirm whether the SC connector plug 3A' is inserted into the SC connector adapter 2A located at a correct position.

In addition, at the time of removal, the database is compared to pick out the SC connector plug 3A' which is a removal target inserted into the SC connector adapter 2A located at a desired position on the patch panel 1. First, the first worker pinches a gripping portion of the SC connector plug 3A' which is a removal target, and changes the color of the discoloration member 8'. The second worker confirms whether the SC connector plug 3A' in which the color of the discoloration member 8' has changed due to the first worker's pinch is a correct removal target. In a case where it is determined to be a correct removal target, the SC connector plug 3A' is removed by the first or second worker.

By performing such an operation, it is possible for a plurality of persons to confirm a target connector plug. This operation makes it possible to reduce the risk of erroneously inserting and removing a connector plug. Since the discoloration member 8' returns to its original color over time (for example, in five to ten minutes), no problem occurs in operation.

Although an optical connector plug has been described in the embodiment, the connector plug of the present invention is not limited to the optical connector plug, and can also be applied to, for example, an electrical connector plug, and the same effect is obtained with any connector plug. In addition, although a case in which a step of inserting and removing (discoloring) a connector plug and a step of confirming the position of a target connector plug are performed by a plurality of workers has been described in the embodiment, the method of the present invention can also be applied to a case in which these steps are performed by a single worker, and the same effect is obtained in either case.

Effects of the Invention

A plurality of persons' confirmation of a target connector plug is facilitated by using the connector plug of the present invention. This makes it possible to reduce the risk of incorrectly inserting and removing the connector plug.

Appendix

The following describes a connector plug of the present embodiment.

The present invention is a technique for preventing a connector plug from being erroneously inserted and removed during its insertion and removal in an optical fiber cable core management wiring board, a patch panel, or the like in which connector adapters are arranged in a high density. According to the present invention, a plurality of workers' confirmation is facilitated when work of insertion and removal is actually performed, which makes it possible to reduce the risk of erroneously inserting and removing a connector plug during its insertion and removal.

(1):

Embodiment 1 is a connector plug to be inserted into a location in which connector adapters are aggregated in a high density such as a patch panel or a communication rack, and which is characterized by using a member whose color changes by pressure being applied to a portion to be pinched during insertion and removal of the connector plug.

(2):

Embodiment 2 is a connector plug to be inserted into a location in which connector adapters are aggregated in a high density such as a patch panel or a communication rack, and which is characterized by using a member whose color changes by heat being applied to a portion to be pinched during insertion and removal of the connector plug.

(3):

The connector plug according to the above (1) or (2), in which a member whose color of a lateral side changes returns to its original color over time.

(4):

A connector insertion method of inserting the connector plug according to any one of the above (1) to (3) into one of a plurality of connector adapters that is arranged, the connector insertion method including, by a worker, holding the gripping portion of the connector plug, changing color of the discoloration member, and inserting the connector plug into a connector adapter of the plurality of connector adapters that is desired, and, by the worker, confirming a position of the connector adapter into which the connector plug with the discoloration member whose color changed is inserted.

(5):

A connector removal method of removing the connector plug according to any one of the above (1) to (3) from one of a plurality of connector adapters that is arranged, the connector removal method including, by a worker, holding the gripping portion of the connector plug and changing color of the discoloration member, by the worker, confirming a position of a connector adapter of the plurality of connector adapters into which the connector plug with the discoloration member whose color changed is inserted, and, by the worker, removing the connector plug with the discoloration member whose color changed from the connector adapter.

REFERENCE SIGNS LIST

1 Patch panel/communication rack
2 Optical connector adapter
2A SC connector adapter
3 Optical connector plug
3A SC connector plug
3A' SC connector plug to be inserted and removed
4 Ferrule
5 Housing
6 Optical fiber cord
7 Gripping portion
8 Discoloration member
8' Discoloration member whose color has changed

The invention claimed is:

1. A connector plug comprising:
   a housing that is substantially in a rectangular parallelepiped, the housing having first and second side surfaces outwardly opposite to each other along a first direction, the housing having first and second ends outwardly opposite to each other along a second direction perpendicular to the first direction;
   an optical fiber cord connected to the first end of the housing and extending along the second direction;
   a ferrule disposed at the second end of the housing;
   a gripping portion that is formed at part of the first and second side surfaces of the housing; and
   a discoloration member that is disposed on part of the gripping portion and that is configured to change original color of the discoloration member to another color due to a change in pressure applied to the discoloration member by touching of a user,
   wherein the discoloration member includes a material exhibiting a piezochromism phenomenon.

2. A connector plug comprising:
   a housing that is substantially in a rectangular parallelepiped, housing having first and second side surfaces outwardly opposite to each other along a first direction, the housing having first and second ends outwardly opposite to each other along a second direction perpendicular to the first direction;
   an optical fiber cord connected to the first end of the housing and extending along the second direction;
   a ferrule disposed at the second end of the housing;
   a gripping portion that is formed at part of the first and second side surfaces of the housing; and
   a discoloration member that is disposed on part of the gripping portion and that is configured to change original color of the discoloration member to another color due to a change in temperature applied to the discoloration member by touching of a user,
   wherein the discoloration member includes a material exhibiting a thermochromism phenomenon and is configured to change the original color when heat of 43° C. or higher is applied by touching of the user.

3. The connector plug according to claim 1, wherein the discoloration member returns, after a change of the original color to the another color, to the original color over time.

4. A connector insertion method of inserting the connector plug according to claim 1 into one of a plurality of connector adapters that is arranged, the connector insertion method comprising:
   by a first worker, holding the gripping portion of the connector plug, changing color of the discoloration member, and inserting the connector plug into a connector adapter of the plurality of connector adapters that is desired; and
   by a second worker, confirming a position of the connector adapter into which the connector plug with the discoloration member whose color changed is inserted.

5. A connector removal method of removing the connector plug according to claim 1 from one of a plurality of connector adapters that is arranged, the connector removal method comprising:
   by a first worker, holding the gripping portion of the connector plug and changing color of the discoloration member;
   by a second worker, confirming a position of a connector adapter of the plurality of connector adapters into which the connector plug with the discoloration member whose color changed is inserted; and
   by one of the first worker or the second worker, removing the connector plug with the discoloration member whose color changed from the connector adapter.

6. A connector insertion method of inserting the connector plug according to claim 2 into one of a plurality of connector adapters that is arranged, the connector insertion method comprising:
   by a first worker, holding the gripping portion of the connector plug, changing color of the discoloration member, and inserting the connector plug into a connector adapter of the plurality of connector adapters that is desired; and by a second worker, confirming a position of the connector adapter into which the connector plug with the discoloration member whose color changed is inserted.

7. A connector removal method of removing the connector plug according to claim 2 from one of a plurality of connector adapters that is arranged, the connector removal method comprising:
- by a first worker, holding the gripping portion of the connector plug and changing color of the discoloration member;
- by a second worker, confirming a position of a connector adapter of the plurality of connector adapters into which the connector plug with the discoloration member whose color changed is inserted; and
- by one of the first worker or the second worker, removing the connector plug with the discoloration member whose color changed from the connector adapter.

\* \* \* \* \*